(12) United States Patent
Dooley et al.

(10) Patent No.: US 8,086,494 B2
(45) Date of Patent: Dec. 27, 2011

(54) SYSTEM AND METHOD FOR AN ELECTRONIC GIFT KEY

(75) Inventors: Christopher P. Dooley, New Canaan, CT (US); Paul S. Nielsen, Saratoga Springs, NY (US); Loren Taylor, Chatham, NJ (US)

(73) Assignees: Product Spring, LLC, New Canaan, CT (US); Taylored Concepts, LLC, Chatham, NJ (US)

( * ) Notice: Subject to any disclaimer, the term of this patent is extended or adjusted under 35 U.S.C. 154(b) by 541 days.

(21) Appl. No.: 12/192,445

(22) Filed: Aug. 15, 2008

(65) Prior Publication Data

US 2009/0063297 A1 Mar. 5, 2009

Related U.S. Application Data

(60) Provisional application No. 60/966,818, filed on Aug. 30, 2007.

(51) Int. Cl.
*G06Q 30/00* (2012.01)
(52) U.S. Cl. ............ 705/26; 705/64; 704/270; 709/204; 235/441; 345/166; 380/278
(58) Field of Classification Search .................... 705/26, 705/64; 704/270; 709/204; 235/441; 345/166; 380/278
See application file for complete search history.

(56) References Cited

U.S. PATENT DOCUMENTS

| 6,321,211 | B1 | 11/2001 | Dodd | |
|---|---|---|---|---|
| 6,588,658 | B1 | 7/2003 | Blank | |
| 6,965,912 | B2 | 11/2005 | Friedman et al. | |
| 7,195,151 | B2 | 3/2007 | Licciardello et al. | |
| 2002/0087319 | A1* | 7/2002 | Stephenson | 704/270 |
| 2002/0103763 | A1* | 8/2002 | Schutz | 705/64 |
| 2002/0138573 | A1* | 9/2002 | Saguy | 709/204 |
| 2003/0085877 | A1* | 5/2003 | Wu | 345/166 |
| 2003/0130907 | A1* | 7/2003 | Karas et al. | 705/26 |
| 2004/0004121 | A1* | 1/2004 | Nakamura et al. | 235/441 |
| 2004/0114766 | A1* | 6/2004 | Hileman et al. | 380/278 |

* cited by examiner

*Primary Examiner* — James Trammell
*Assistant Examiner* — Sanjeev Malhotra
(74) *Attorney, Agent, or Firm* — Michael Crilly, Esq.

(57) ABSTRACT

A system and method for a physically-based gift key enabling a purchaser to deliver a single, fully-integrated gift item to a recipient and including an electronic greeting card and store credits redeemable online is presented. The method includes the steps of activating a gift key, customizing an electronic greeting card associated with the gift key at a host site via physical or wireless linkage of a gift key to a first local computer, accessing the greeting card at the host site via linkage of the gift key to a second local computer, and redeeming a store credit associated with the gift key at a retail website accessible from the host site. The system includes a gift key and a host computer system directly or indirectly controlling a host site. The gift key has a housing, an integrated circuit within the housing, and a connector or wireless interface extending from the housing so as to allow linkage of the gift key with a computer remotely located with respect to the host and retailer sites. The local computer automatically launches a website at the host or retailer levels when the gift key is linked to the local computer.

28 Claims, 9 Drawing Sheets

SYSTEM AND METHOD FOR AN ELECTRONIC GIFT KEY

CROSS REFERENCE TO RELATED APPLICATIONS

This application is based upon and claims priority under 35 U.S.C. §119(e) from U.S. Provisional Application No. 60/966,818 filed Aug. 30, 2007, entitled System and Method for an Electronic Gift Key, the contents of which are hereby incorporated in their entirety by reference thereto.

FEDERALLY SPONSORED RESEARCH AND DEVELOPMENT

None.

BACKGROUND OF THE INVENTION

1. Field of the Invention

The present invention generally relates to an electronic gift key enabling a purchaser to deliver a single, fully-integrated gift item to a recipient including an electronic greeting card and redeemable store credits. Specifically, the invention includes a system and method whereby an electronic gift key, comprising a decorative housing with integrated circuit and memory therein and an interface projecting therefrom, is linkable to a computer either physically or wirelessly, thereafter launching a website at a host site so as to allow a purchaser to customize a greeting card and also allow a recipient to access the customized greeting card at the host site and/or redeem store credits associated with the gift key at a retail and/or host website.

2. Background

Gift certificates and gift cards enjoy ever increasing popularity because of their convenience and ability to allow a recipient thereof to redeem store credits for the purchase of items desired by a recipient, rather than gifts chosen by a purchaser.

Gift certificates and cards are essentially the same, except that gift cards automate the checkout and accounting processes via a barcode or magnetic strip which is scanned or swiped at the time of purchase and use.

Gift cards may or may not have an assigned value prior to purchase. For example, some gift cards have no value until they are sold, at which time a cashier enters the amount which a buyer wishes to associate with the card. This information is rarely stored on the card, but rather stored in a database operated by a retailer which is cross referenced to the card via an identifier when a transaction is processed. Other gift cards, often referred to as stored-value cards, have a fixed value which is stored directly on the card and updated after each transaction. Stored-value cards eliminate the need for checkout and accounting processes at a remote site, thus simplifying network support requirements.

Counterfeiting is a major problem with gift cards typically mitigated via encryption methods and card design. Encryption methods are generally not robust given the relatively low monetary value assigned to gift cards. In terms of card design, a magnetic strip is often placed at a location along the card to prevent compatibility with many read/write devices.

Furthermore, gift certificates and gift cards require the purchaser to buy a non-customized greeting card separate and apart from the certificate or card. This reduces both perceived and actual convenience of gift certificates and cards.

Finally, gift certificates and cards require the purchaser or recipient to travel to a physical location operated by a retailer for the purpose of redemption. As such, many gift certificates and cards are never used. These lost transactions also include lost interactions during which advertising and marketing activities are possible to encourage impulse purchases beyond the value associated with the certificate or card.

As is readily apparent from the discussions above, the related arts do not include a decorative gift item physically presentable to a recipient by a purchaser whereby the gift item enables the purchaser to electronically customize online content for the recipient and further enables the recipient to access the customized content and redeem store credits at one or more online retail sites.

Therefore, what is required is a system and method which allow for the purchase, transfer, and use of a single physically-based gift item, enabling access to an electronic greeting card and redeemable store credits via the internet in a secure, convenient, customizable, and controllable manner.

SUMMARY OF THE INVENTION

An object of the present invention is to provide a system and method which allow for the purchase, transfer, and use of a single physically-based gift item enabling access to an electronic greeting card and redeemable store credits via the internet in a secure, convenient, customizable, and controllable manner.

In accordance with embodiments of the invention, the method includes the steps of activating a gift key, customizing an electronic greeting card associated with the gift key at a host site via physical or wireless linkage of the gift key to a first local computer, accessing the optional greeting card at the host site via linkage of the gift key to a second local computer, and redeeming a store credit associated with the gift key at a retail website accessible from the host site. In one embodiment, the gift key could include a housing, an integrated circuit within the housing, and a connector or wireless interface extending from the housing so as to allow linkage of the gift key with a computer remotely located with respect to the host and retail sites. The connector facilitates a physical connection between gift key and local computer. The wireless interface facilitates wireless communication between gift key and local computer. First and second local computers communicate with the host site via a network, preferably the Internet.

In accordance with embodiments of the invention, the system includes a gift key and a host computer system directly or indirectly controlling a host site. The gift key has an identifier number and at least one web address readable therefrom and a security program executable by an integrated circuit within the key. The gift key is linkable to a local computer system via the connector or wireless interface thereon. The host computer system interacts with a host site facilitating design of an electronic greeting card associated with the gift card, display of the greeting card, and redemption of store credits associated with the gift key via a computer system controlling a retail website. Store credits are either pre-stored on the gift key or added to the gift key when the key is purchased. The gift key communicates with the host and retailer computer systems via a network. The gift key automatically launches a website at the host or retailer levels when the gift key is linked to a local computer system.

In accordance with preferred embodiments of the invention, the gift key could include a three-dimensional device with a plastic outer housing stylized as a toy or other decorative object and a USB connector extending or extendable therefrom. The housing could be a licensed character, action figure, vehicle, or any object suitable for presentation as a gift.

The housing ensures the gift key has play value and appeal long after the electronic greeting card is viewed and store credits are depleted. Electronics within each gift key contain a serial or global unique identifier (GUID) number used as a cross reference to uniquely identify the gift key for accessing product features, greeting card, and store credits.

In accordance with preferred embodiments of the invention, the USB connector enables the gift key to be physically connected to a personal computer or the like via a connector residing on the computer, thereafter automatically launching a web browser to a host and/or retailer website via Internet Explorer®, a registered trademark of Microsoft Corporation, Safari®, a registered trademark of Apple, Inc., or the like. The serial or GUID number is communicated from the gift key to the host or retailer website via encryption protocols, one example being a 128 bit encryption format.

A purchaser connects or links the gift key to a computer prior to physically transferring the key to a recipient. The gift key communicates a web address for the host site to the web browser executable on the computer. After security protocols are verified with the host site, a website is automatically launched so that the purchaser might view the store credits accessible with the key and customize an electronic greeting card which resides on the host website. The host website allows the purchaser to choose a card type, non-limiting examples being a holiday, birthday, or other special event, and to embed text, pictures, or videos into viewing areas on the electronic greeting card creating a personalized message to the recipient. The electronic greeting card and store credit information resides on the host site for later access by a recipient.

After physical acceptance of the gift key by a recipient from a purchaser, the recipient connects or links the gift key to a computer. The gift key communicates a web address for the host site to the web browser executable on the computer. After security protocols are executed and satisfied between the gift key and the host site, a website is automatically launched so that the recipient might view the store credits accessible with the key and the electronic greeting card prepared by the purchaser, as well as access a retail website for online shopping and redemption of store credits.

In accordance with some embodiments of the invention, the recipient could access theme related content corresponding to the appearance of the gift key at the host website. For example, a gift key having a character-based theme might allow access to games, movie trailers, facts and biographic data, and other media associated with the character.

In accordance with other embodiments of the invention, the host website could include online links to one or more retailers when store credits are not restricted to a specific retailer. Links could be specific to the type of gift key so as to target and guide a consumer's shopping experience and/or increase sales of a preferred retailer. For example, a character based gift key could automatically forward a recipient to one or more specific web pages at a retailer's online site.

Several advantages are offered by the described invention. The gift key provides both electronic and physical functionalities which in combination enhance the collectability, appeal, and play value of the gift item. Decorative aspects and electronic functionality of the gift key provide for an overall package design which is highly customizable for a specific recipient. Electronic functionality of the gift key maximizes the flexibility afforded to the recipient in terms of use and redemption options. Electronic functionality of the gift key facilitates access to theme specific content by a recipient so as to target and guide purchasing behavior. Physical aspects of the gift key provide a fully integrated package design which avoids the cost and complexities of supplemental gift wrapping.

| REFERENCE NUMERALS | |
|---|---|
| 1 | Local system |
| 2 | Network |
| 3 | Host system |
| 4a-4f | Retailer system |
| 5 | Gift key |
| 6 | Port |
| 7 | Physical interface |
| 8a, 8b | Housing |
| 9 | Circuit board |
| 10 | Integrated circuit |
| 11 | Wire assembly |
| 12 | Hook |
| 13 | Chain |
| 14 | Button |
| 15 | Interface |
| 16 | Wireless interface |
| 17 | Wireless interface |
| 18 | Light |
| 19 | Cover |
| 20 | Card creator webpage |
| 21 | CARD TYPE button |
| 22 | DESIGN button |
| 23 | Preview window |
| 24 | NEXT button |
| 25 | SAVE button |
| 26 | EXIT button |
| 27 | UPLOAD FILE button |
| 28 | Upload frame |
| 29 | ACTIVATION button |
| 30 | Webpage |
| 31 | INTRODUCTION button |
| 32 | TEXT button |
| 33 | CUSTOM TEXT button |
| 34 | SIGNATURE button |
| 35 | Preview window |
| 36 | PREVIOUS PAGE button |
| 37 | SAVE button |
| 38 | EXIT button |
| 39 | Display frame |
| 40 | Greeting card webpage |
| 41 | Cover page frame |
| 42 | Text page frame |
| 43 | RETAILER button |
| 44 | EXIT button |
| 45 | Gift value field |
| 46 | Retailer field |
| 50-53 | Step |
| 54a, 54b | Appendage |
| 55 | Nub |
| 56 | Channel |
| 57a, 57b | Opening |
| 58a, 58b | Opening |
| 59a, 59b | Opening |
| 60 | Loop |
| 61 | Retailer level |
| 62 | Purchaser level |
| 63 | Host level |
| 64 | Recipient level |
| 65 | Retailer network |
| 66-82 | Step |
| 83 | Slot |
| 84 | Landing webpage |
| 85 | Advertisement frame |
| 86 | CREATE CARD button |
| 87 | VIEW CARD button |
| 88 | ONLINE SHOPPING button |
| 89 | ONLINE CONTENT button |
| 90 | EXIT button |

BRIEF DESCRIPTION OF THE INVENTION

Additional aspects, features, and advantages of the invention will be understood and will become more readily apparent when the invention is considered in the light of the following description made in conjunction with the accompanying drawings, wherein.

DETAILED DESCRIPTION

Figure 1:
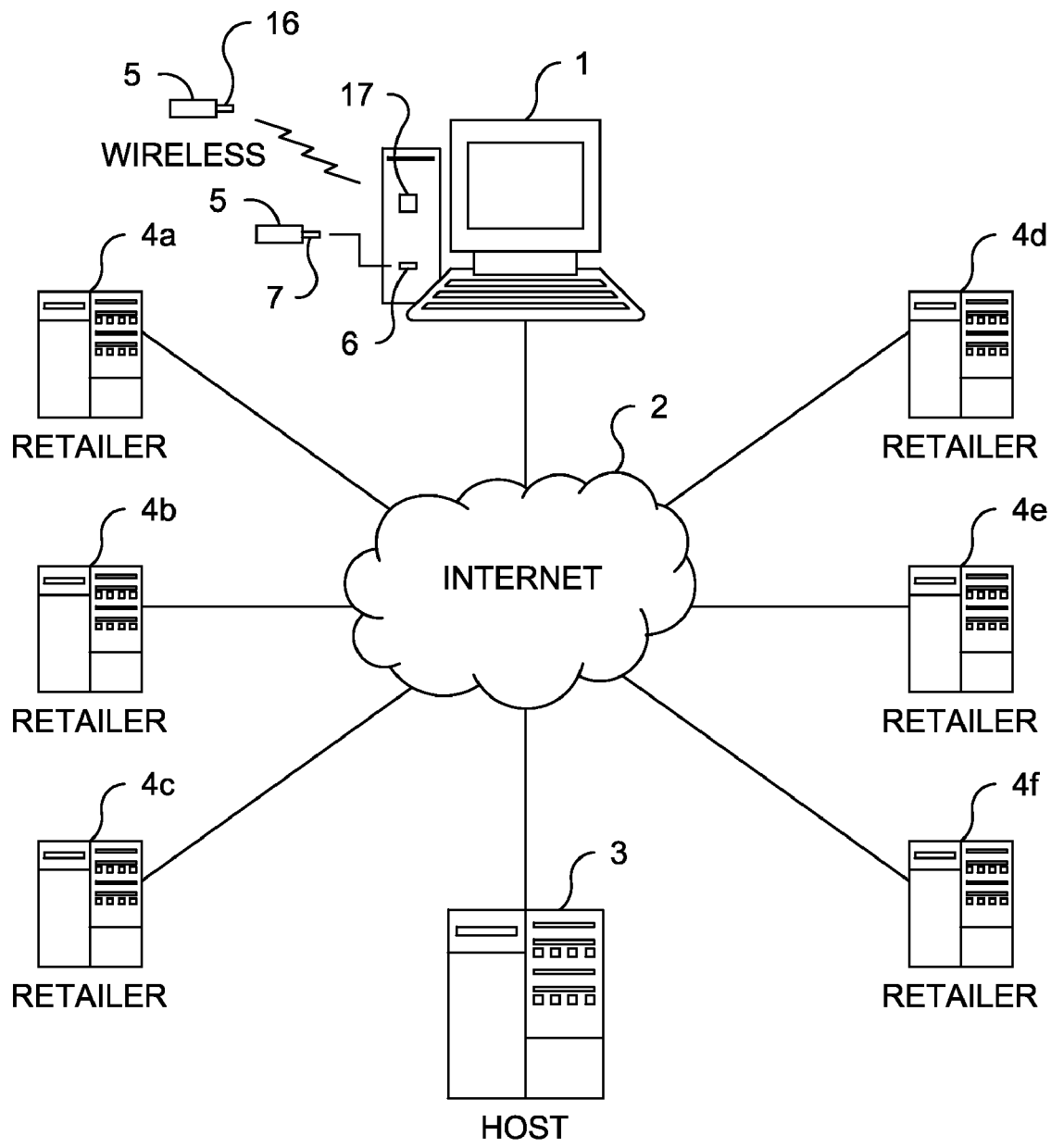
FIG. 1 is a schematic diagram illustrating interaction between a gift key linkable to a local computer either physically or wirelessly, a host site, and one or more retailer sites via the internet in accordance with an embodiment of the invention.

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. The words communicate, connect, couple, link, and similar terms with their inflectional morphemes do not necessarily denote direct and immediate connections, but also include connections through intermediary elements or devices.

Referring now to FIG. 1, embodiments of the invention include a gift key 5 having a physical interface 7 which is attachable or linkable to a port 6 residing on a local system 1 or a wireless interface 16 which communicates with a complimentary wireless interface 17 residing on a local system 1. The local system 1 could include a personal computer, laptop computer, or other similar device having a port and capable of communication via wire or wireless means with a network 2. The network 2 is a communication system which allows two or more computer systems to communicate, a preferred example being a collective electronic network of computers and computer networks which are inter-connected throughout the world, otherwise referred to as the Internet. Communication by and between the local system 1, network 2, host system 3, and retailer systems 4a-4f are via protocols and methods understood within the art.

The network 2 also facilitates communication with a host system 3 and at least one retailer system 4a-4f. Host system 3 and retailer systems 4a-4f could include computer hardware and software which display a website or the like over a network 2 and allow communication therewith by one or more local systems 1.

The host system 3 communicates with a gift key 5 via the local system 1 so as to allow a purchaser of the gift key 5 to customize a greeting card associated with the gift key 5 via a serial or global unique identifier (GUID) number stored on a read-only memory (ROM) or similar device housed within the gift key 5. The host system 3 also enables a recipient of a gift key 5 to view the greeting card via a local system 1. The host system 3 further communicates with a gift key 5 so as to allow a recipient to redeem store credits associated with the gift key 5 via a serial number, GUID number, or other similar security identifier stored electronically within the gift key 5.

The retailer systems 4a-4f are accessible via the host system 3 and graphically displayed on the local system 1. Each retailer system 4a-4f controls a website or the like which displays goods and services for sale and allows for the purchase thereof. Although six retailer systems 4a-4f are described in FIG. 1, the number of retailer systems 4a-4f could be one or more systems operated by one or more retailers or the like.

Figure 2:
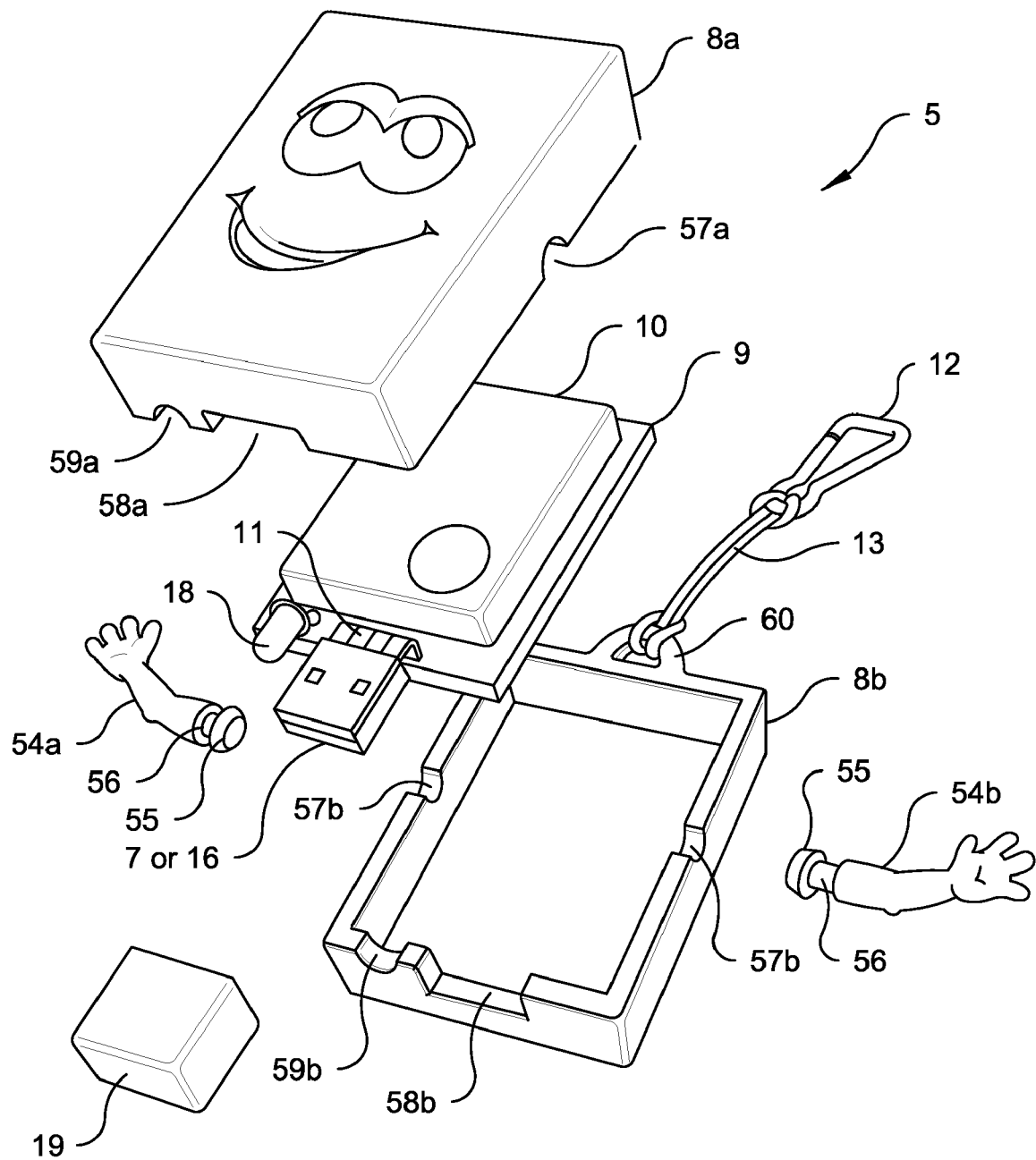
FIG. 2 is an exploded view illustrating housing, circuit board, integrated circuit, and interface for an exemplary gift key in accordance with an embodiment of the invention.
Figure 3A:
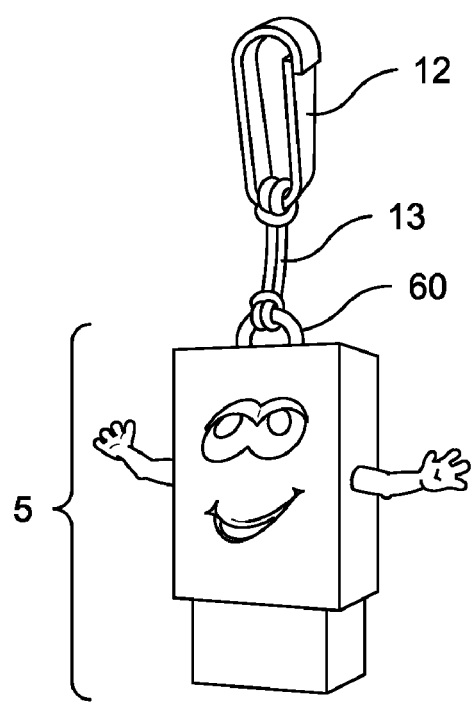
FIG. 3a is a front side perspective view illustrating an exemplary decorative gift key configured as a keychain and having a movable USB plug fully retracted within a decorative housing in accordance with an embodiment of the invention.
Figure 3B:
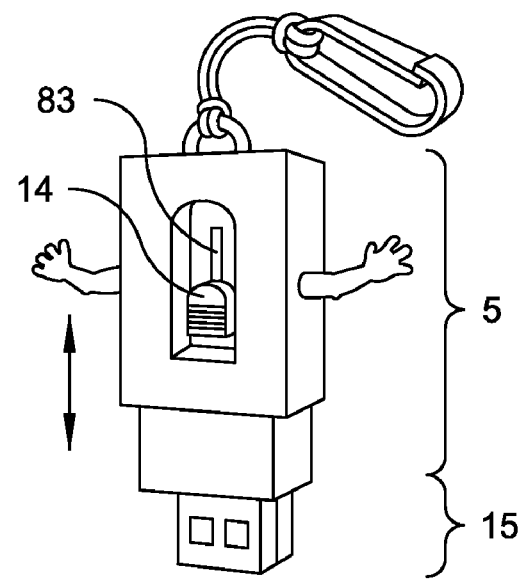
FIG. 3b is a rear side perspective view illustrating an exemplary decorative gift key configured as a keychain and having a movable UBS plug fully extended from a decorative housing in accordance with an embodiment of the invention.

Referring now to FIG. 2, an exemplary gift key 5 is shown including a two-piece housing 8a, 8b disposed about and protecting a circuit board 9, an integrated circuit 10, a wire assembly 11, and a physical interface 7 and/or a wireless interface 16. The housing 8a, 8b could be composed of a plastic composition and include a decorative design which is printed, molded thereon, or attached thereto. For example, the housing 8 a, 8b could be shaped as a cartoon character as shown in FIGS. 2, 3a, 3b or have the appearance of any object suitable as a gift. Also, the housing 8a, 8b, may include two or more elements which are movable so as to change the overall shape and appearance of the gift key 5. The housing 8a, 8b is intended to support and protect at least the elements mentioned herein.

A variety of circuitry designs and connectors could reside within the gift key 5. For example, a circuit board 9 could be fastened or adhered to the housing 8a or 8b and thereafter attached to the integrated circuit 10. A physical interface 7, one example being a USB connector, or a wireless interface 16 could be attached to the housing 8 a, 8b via a fastener or adhesive and, thereafter, electrically connected to the integrated circuit 10 via a wire assembly 11. Housing 8a, 8b elements are joined and fixed via a fastener or an adhesive to form a protective covering about the electronic components described herein.

In preferred embodiments, components comprising the gift key 5 are powered by the local system 1 via the physical interface 7. In wireless embodiments, a power supply, one example being a battery, is provided within the housing 8a, 8b and electrically coupled to components therein.

The wireless interfaces 16, 17 could include devices which facilitate the functionality of a physical connector without direct contact between the interface elements. For example, wireless interfaces 16, 17 may include optical devices, examples including but not limited to IrDA elements, or RF devices, examples including but not limited to Bluetooth, WiFi, passive RFID tag, and the like, which enable unidirectional or bi-directional communication between a gift key 5 and a local system 1.

In some embodiments of the invention, the gift key 5 could further include a light 18 which extends from the housing 8a, 8b through a like shaped opening formed by complimentary openings 59a, 59b. The light 18 could be electrically connected to components on the circuit board 9 so as to display the operational and/or power states of the integrated circuit 10. For example, the light 18 could be a light emitting diode, whereby the ON state of the gift key 5 is indicated when the light 18 is green, communication states between local system 1 and host system 3 or retailer systems 4a-4f is indicated when the light 18 is yellow, and/or a functional or power fault state is indicated when the light 18 is red. Other visual display queues are possible.

The gift key 5 could also include appendages 54a, 54b which replica the arms, legs, and/or head of a character. Each appendage 54a, 54b could include a nub 55 and a channel 56, the latter secured between the paired arrangement of openings 57a, 57b, which compliment the shape of each channel 56 so as to fix the appendages 54a, 54b to the housing 8a, 8b or allow the appendages 54a, 54b to move or rotate with respect to the housing 8a, 8b.

In some embodiments, the physical interface 7 or wireless interface 16 could extend from the gift key 5 in a fixed arrangement through a like shaped opening formed by the paired arrangement of openings 58a, 58b. An optional cover 19, composed of a plastic cup-shaped element, could be used to cover the physical interface 7 or wireless interface 16 in a secured but removable fashion so as to prevent contaminants from damaging the interface.

In yet other embodiments, the gift key 5 could include elements which allow it to function as a key chain or facilitate attachment to a school bag, handbag, or other object. For example, the gift key 5 could have a loop 60 molded or attached to the housing 8a, 8b. One end of a chain 13 could be secured to the loop 60 and the other end secured to a hook 12.

Preferred embodiments of the gift key 5 could include an integrated circuit 10 with both internal masked ROM and flash EEPROM with built in USB controller. In one example, the integrated circuit 10 could be a universal serial bus microcontroller, model number EM78M612, sold by ELAN Microelectronics Corporation. The masked ROM could include twelve kilobytes of memory to store an operating system program. The operating system program could include a self-executable program which is automatically launched via an internet browser on a local system 1 when linked to a gift key 5. The program is intended to direct the local system 1 to a website controlled by a host system 3, as described herein. The operating system program could also include a security handshake algorithm which transfers an identifier or serial number unique to each gift key 5 so as to establish communication between a website at the host system 3 and a local system 1. Security protocols could prevent hackers from altering or otherwise bypassing the serial number electronically stored on the gift key 5, operating program, and/or website link. The masked ROM could also include a number of website addresses allowing one web address to be selected based upon the serial number stored on the EEPROM.

In some embodiments, the EEPROM could include four bytes to store a thirty-six digit individualized serial number. The serial number could be embedded with two digits which identify the web address of the retailer system 4a-4f stored on the masked ROM. This data could be stored on the internal memory of the EEPROM. In other embodiments, the EEPROM could be a separate device from the integrated circuit.

In preferred embodiments, the gift key 5 could include a micro-controller unit with internal EEPROM capable of storing a thirty digit GUID number, one example being model number SPCP18E2A sold by Sunplus Innovation Technology, Inc., a ROM element capable of storing an operating system and web link addresses, and a USB 1.1 or higher connector compatible with personal and Apple computers and capable of communicating power to the micro-controller unit and other elements along the circuit board 9.

Executable programs on the integrated circuit 10 facilitate communication between a gift key 5 and host system 3. Communication between gift key 5 and host system 3 is authorized after a security handshake algorithm is properly executed, thereby allowing an interface between a website and a remotely located local system 1. The handshake program is automatically launched and executed after a physical interface 7 on the gift key 5 is properly linked to a complimentary port 6 on a local system 1 or wireless interfaces 16, 17 are successfully linked. After the security handshake program is verified, the individualized serial number is transferred from the EEPROM memory to the host system 3.

Each EEPROM is programmed with at least one web address and a GUID number or the like, preferably thirty digits long; however, the number of digits is design and use dependent and may be longer or shorter. In some embodiments, the GUID number may not be the actual account number stored in the retailer's system so as to further enhance security. Non-correlated GUID numbers prevent the theft of account numbers because the latter is never passed from the gift key 5 to the host system 3 and/or retailer systems 4a-4f. Theft of a GUID number alone is not sufficient to access and redeem store credits at the host and retail levels.

Each integrated circuit 10 has an internal EEPROM that is unreadable by a hacker or the like. Since each EEPROM is internal to the integrated circuit 10 and not a separate component removable from the circuit board 9, the ROM operating system protects data in the EEPROM from being retrieved because an external lookup table is required to correctly map and retrieve the GUID number data.

When a gift key 5 is plugged into or otherwise linked to a local system 1 by a purchaser or recipient, the gift key 5 automatically launches the web browser executable on the local system 1 and addresses an invisible form webpage residing on the host system 3 based on a web address stored on the gift key 5. The invisible webpage could have a thirty digit GUID number embedded and encrypted therein via a 128 bit header trigger template (HTTS). Every gift key 5 calls the same web link address, one example being www.3dgiftcard.com/register, and communicates its device specific GUID number to the site for identification and authentication purposes. In alternate embodiments, the actual account number could be stored on the EEPROM and passed to the host system 3 via the invisible webpage. This latter approach simplifies database and bar coding requirements at the host and retail levels.

After receipt of the GUID number, the host system 3 decrypts the GUID number and correlates the GUID number to the account number and personal identification number (PIN) stored within a database or the like on the host system 3. Next, the host system 3 directs the web browser residing on the local system 1 to the correct webpage based on the card style and user. For example, the web browser could be directed to pages facilitating the customization of an electronic greeting card when the user is a purchaser and to pages which facilitate viewing of the greeting card and redemption of store credits when the user is a recipient. In preferred embodiments, the system and method described herein assumes first use of the gift key 5 is by a purchaser and subsequent uses are by a recipient.

Digits within the GUID number are parsed to identify the style and number assigned to the gift key 5. For example, the first six digits in a thirty digit GUID number could correspond to the key style number and the last twenty-four digits to the key identifier number.

The key style number could correspond to the decorative theme appearing on the housing 8a, 8b of the gift key 5, the retailer at which store credits are redeemable, or another classification system which logically links webpage content and design to the gift key 5 and/or its intended use. It is likewise possible for the key style to also identify the forwarding links to retailers which might appear on the host system 3 and retailer systems 4a-4f.

The key identifier number is a number assigned to each gift key 5 for identification purposes. The host system 3 processes the key identifier number to identify the account number for access to store credit data and PIN or security code for a specific retailer, as well as any customized electronic greeting card prepared specifically by a purchaser for a recipient. Accordingly, the key identifier number facilitates the automatic launch of the key specific greeting card when the gift key 5 is linked to a local system 1.

In preferred embodiments, the key identifier number should have sufficient digits to allow it to be processed as a credit card for non-restricted retailer applications. Presently, most credit cards require twenty-three digits to properly identify the account number (sixteen digits), expiration date (four digits), and PIN (three digits) for transaction purposes.

In some embodiments, it might be advantageous to print the GUID number onto the housing 8a, 8b of the gift key 5 in a first bar code format. This bar code could be used to record the purchase of the gift key 5 by a purchaser at the retail level. This information could be communicated to the host system 3 so that subsequent use of the gift key 5 is permitted at the host and retail levels.

In yet other applications, a second bar code could be applied to the gift key 5 adjacent to the first bar code. This second identifier could be applied by an industry certified factory, separate and apart from the source of the first bar code, and used to identify the account number and optional PIN associated with the gift key 5. Two separately printed bar codes minimize potential security breaches otherwise possible when the same factory applies both bar codes. Correlation between account number/PIN and GUID number could be performed by scanning both numbers at the point-of-sale by a retailer to a purchaser or at a factory authorized to scan and correlate identifiers, which is thereafter communicated to the host system 3.

In other embodiments, a single bar code could be printed onto the gift key 5 so as to identify the account number and PIN only. The account number would be stored on the EEPROM within the gift key 5. This approach simplifies the bar code labeling process as only one bar code matching the device's EEPROM would be required.

Alternately, a single bar code with account number and PIN could be printed onto the gift key 5 and the GUID number stored in the device's EEPROM. When the user connects to the host system 3, the GUID number is passed to the invisible webpage and the user is required to manually enter the account number and PIN displayed on the housing 8a, 8b of the gift key 5 via a security login page displayed by the host system 3 or retailer systems 4a-4f. The login process could compare the GUID number and account numbers stored by the host system 3 to properly verify access to the host site.

Referring now to FIGS. 3a and 3b, the gift key 5 could include an interface 15 extendable from and retractable into the housing 8a, 8b so as to protect the interface 15 and enhance the overall appearance of the gift key 5. The interface 15 could be a physical connector or wireless device, as described herein. The interface 15 would be disposed in a sliding fashion along cavity within the interior of the housing 8a, 8b. The interface 15 could be attached to a button 14 likewise slidable along a slot 83, as represented in FIG. 3b. A user would extend the interface 15 in part or whole by sliding the button 14 in one direction along the slot 83 and retract the interface 15 in part or whole into the housing 8a, 8b by sliding the button 14 in the opposite direction along the same slot 83. The button 14 could lock into one or more positions along the slot 83 to secure the interface 15 with respect to the housing 8a, 8b.

Figure 4:
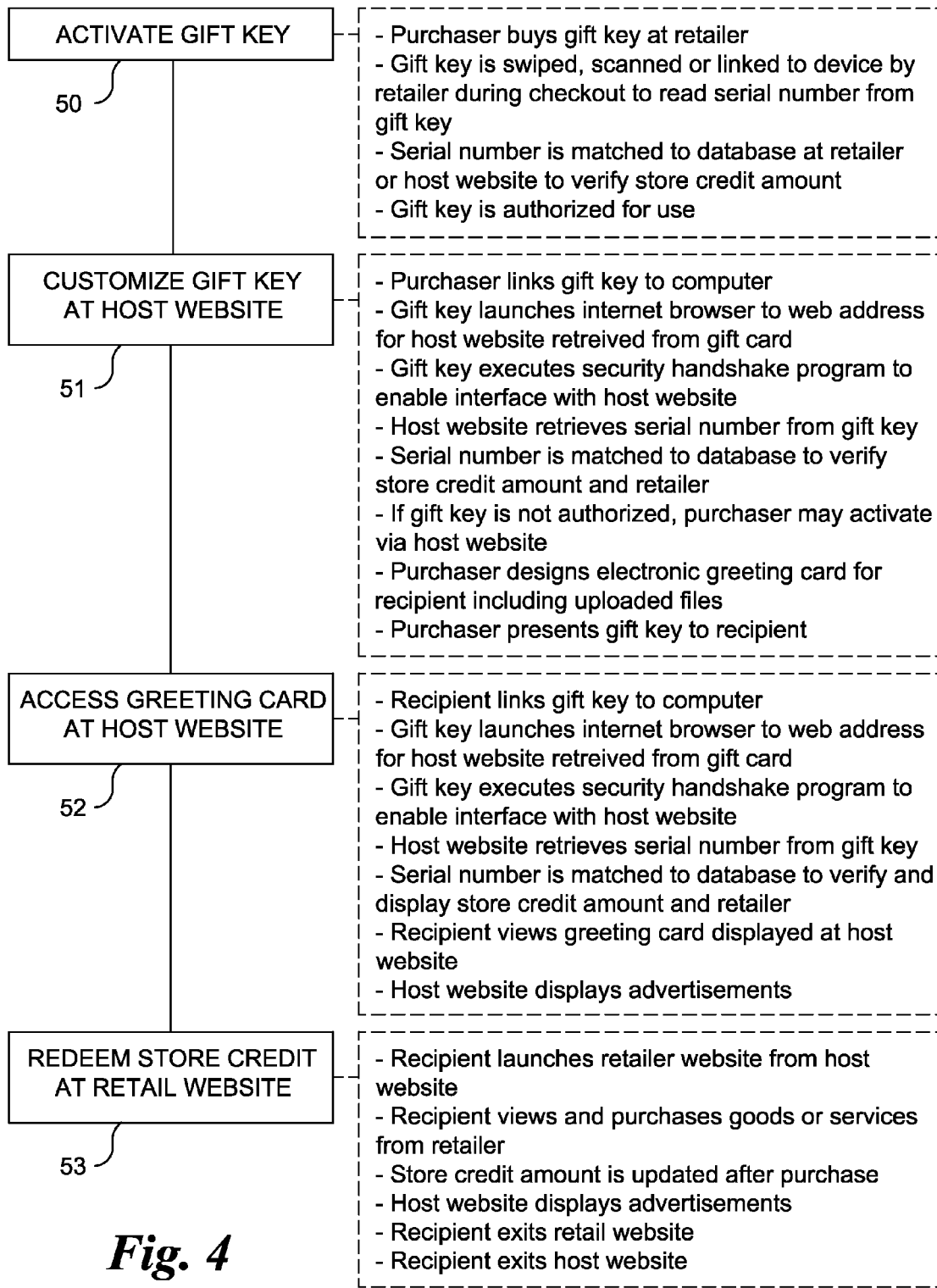
FIG. 4 is a flowchart illustrating transactional steps in accordance with an embodiment of the invention.

Referring now to FIG. 4, one exemplary embodiment of the method is described including the steps of activating a gift key 5, customizing a gift key 5 at a host website 51, accessing a greeting card at a host website 52, and redeeming a store credit at a retail website 53. The customizing and accessing steps are optional.

The activation step 50 is performed when the gift key 5 is purchased at the point-of-sale by a purchaser from a retailer, online or telephonically. The activation step 50 could include a variety of sub-steps, non-limiting examples including: (1) purchaser buys a gift key 5 from retailer; (2) gift key 5 is swiped to read magnetic strip or scanned to read a bar code on gift key 5 or packaging therefore, or linked, via the physical interface 7 or wireless connector 16, to a device, one example being a register, during checkout to read an identifier, examples being a serial, GUID or account number, specific to the gift key 5; (3) serial, GUID, or account number from the gift key 5 is cross referenced to database information at the point-of-sale or elsewhere to validate gift key 5, store credit amount, retailer for store credit, and other pertinent transactional information; and (4) gift key 5 is authorized for use at a host system 3. When the purchase is made remotely, the activation step is performed before shipment to the purchaser.

The customization step 51 is performed by the purchaser before the gift key 5 is delivered to a recipient. The customization step 51 could include a variety of sub-steps, non-limiting examples including: (1) purchaser links the gift key 5 via physical or wireless means to a local system 1; (2) gift key 5 automatically launches an internet browser to a web address retrieved from the gift card 5 for the website at the host system 3; (3) gift key 5 executes a security handshake program to enable interface with host website; (4) host website retrieves an identifier, examples being a serial, GUID, or account number, from the gift key 5 so as to properly identify the gift key 5; (5) identifier is cross referenced with database information to verify store credit amount and/or name of retailer; (6) purchaser could activate gift key 5 via host website when gift key 5 is not authorized in sub-step (5); (7) purchaser designs electronic greeting card for recipient which could include uploading image, video, and/or audio files embedded within the greeting card; and (8) purchaser presents gift key 5 to a recipient.

The access step 52 is performed by the recipient using a local system 1 which could be the same or different device used by the purchaser, as described herein. The access step 52 could include a variety of sub-steps, non-limiting examples including: (1) recipient links the gift key 5 via physical or wireless means to a local system 1; (2) gift key 5 automatically launches an Internet browser to a web address retrieved from the gift key 5 for the host website displayed by the host system 3; (3) gift key 5 executes a security program to verify identity and enable communication with the host; (4) host website retrieves an identifier, examples being a serial, GUID, or account number, from the gift key 5 so as to properly identify the gift key 5; (5) identifier is cross referenced with database information to verify store credit amount and/or name of retailer; (6) recipient views optional greeting card, displayed by host website, associated with gift key 5 via the identifier; and (7) host website could display advertisements specific to the identified retailer.

The redemption step 53 is performed by the recipient using a local system 1 which may or may not be the device used by the purchaser, as described herein. The redemption step 53 could include a variety of sub-steps, non-limiting examples including: (1) recipient links gift key 5 via physical or wireless means to a local computer 1 to automatically launch host or retailer website; (2) recipient launches retail website displayed by a retailer system 4a-4f corresponding to information retrieved from a gift key 5 by the host system 3; (3) recipient views and purchases goods and services from retailer via its retail website; (4) host website may display advertisements specific to identified retailer or content and theme specific media; and (5) recipient exits retail and/or host websites. Direct launch of a retailer website could require the execution of security protocols described herein to be performed at the retailer level.

The host website includes web pages enabling a purchaser to customize a greeting card and a recipient to view a customized greeting card and access one or more retailers. Web pages could include a variety of layouts and features. Webpages are written in one or more program languages understood in the art. Webpages are communicated to a local system 1 via the host system 3 over a network 2. In some embodiments, the design and content offering could depend on the design or theme of the gift key 5, as described herein.

FIGS. 5-8 describe several exemplary web pages used by a purchaser and recipient to access online features associated with the gift key 5. Other designs, layouts, and options are possible, including access to theme specific games, media, and online information and resources. Web pages described in FIGS. 5-8 provide for one possible embodiment of the content accessible with a gift key 5. Web pages are not meant to be exhaustive of the appearance and functionality of the described invention, but rather are merely illustrative to assist in describing aspects of the online content and its function in the manner described herein.

Figure 5:
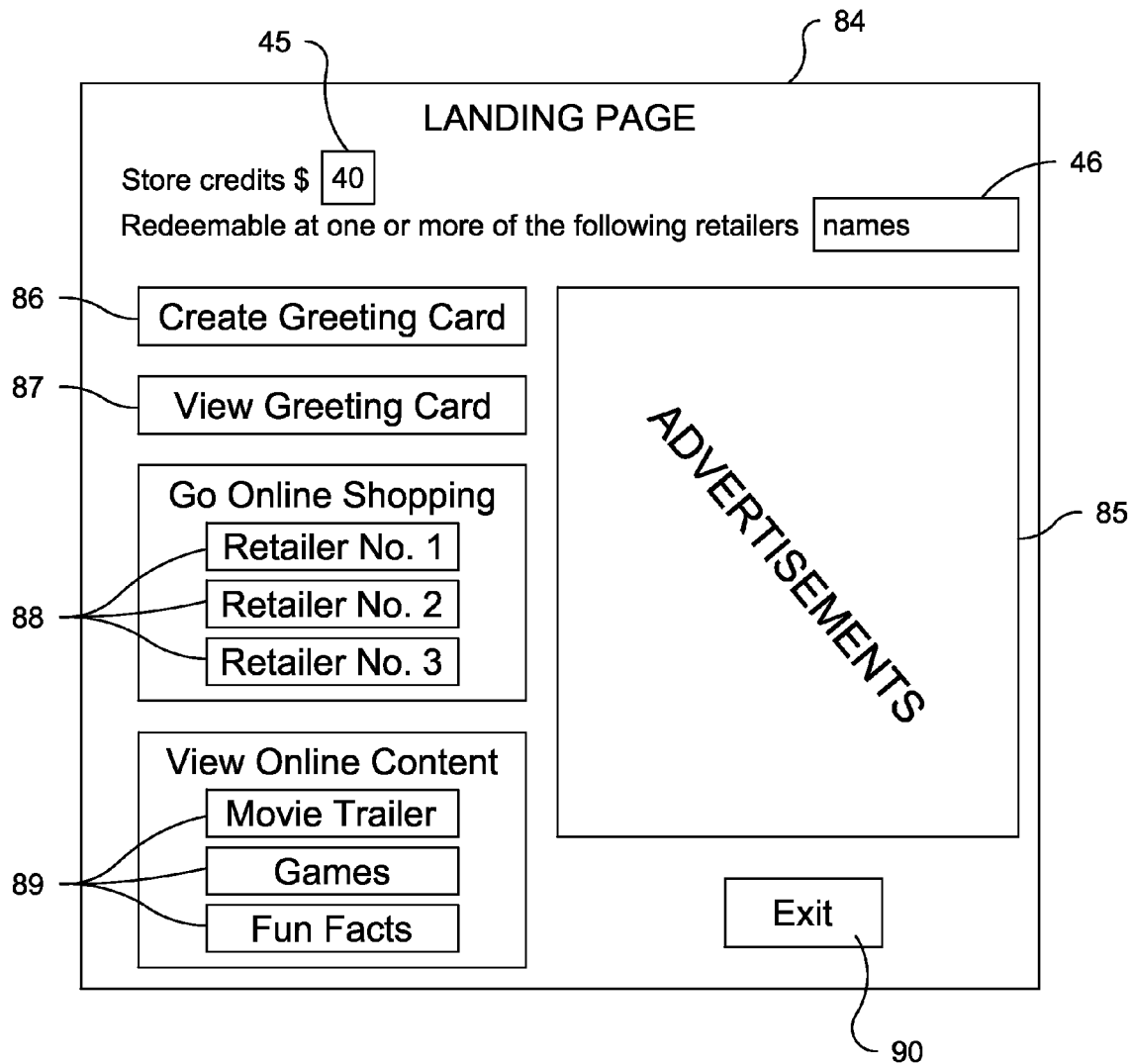
FIG. 5 is an exemplary webpage displayed by a host site used by a purchaser or a recipient to access online features via the gift key and website in accordance with an embodiment of the invention.

Referring now to FIG. 5, an exemplary landing webpage 84 is shown including a variety of frames, fields, and buttons. The landing webpage 84 is an optional page displayed on a local system 1 via a host system 3 after linkage of a gift key 5 to a local system 1 and a security algorithm is properly completed. In some embodiments, the landing webpage 84 could be a single page with features pertinent to a purchaser and recipient. In other embodiments, the landing webpage 84 could be two pages separately showing features pertinent to a purchaser and a recipient. In preferred embodiments, the landing webpage 84 includes designs and features which are theme specific and/or correspond to the decorative appearance of the gift key 5. For example, a gift key 5 having the appearance of an action figure could access a landing page 84 with an advertisement frame 85 which displays goods and/or services corresponding to the action figure. The advertisement frame 85 could display a video, play an audio message, or communicate interactively with the viewer via known formats and protocols. In some embodiments, the advertisement frame 85 could include two or more separate frames which appear at various locations along the landing webpage 84. In other embodiments, the advertisement frame 85 could appear as the background in a webpage or in the foreground as a pop-up screen. In yet other embodiments, one or more additional advertisement frames 85 could appear on the web pages shown in FIGS. 6-8. An EXIT button 90 is provided to close the link between local system 1 and host system 3 and all advertisement frames 85, so as to redirect the web browser on the local system 1 to its default page.

The gift value field 45 and retailer field 46 display information specific to the gift key 5 relevant to store credits data stored at the host system 3. The retailer field 46 could include one or more names. When the gift key 5 is redeemable at any retailer, the retailer field 46 could include one or more suggested retailers to focus and direct purchases by the recipient.

Figure 6:
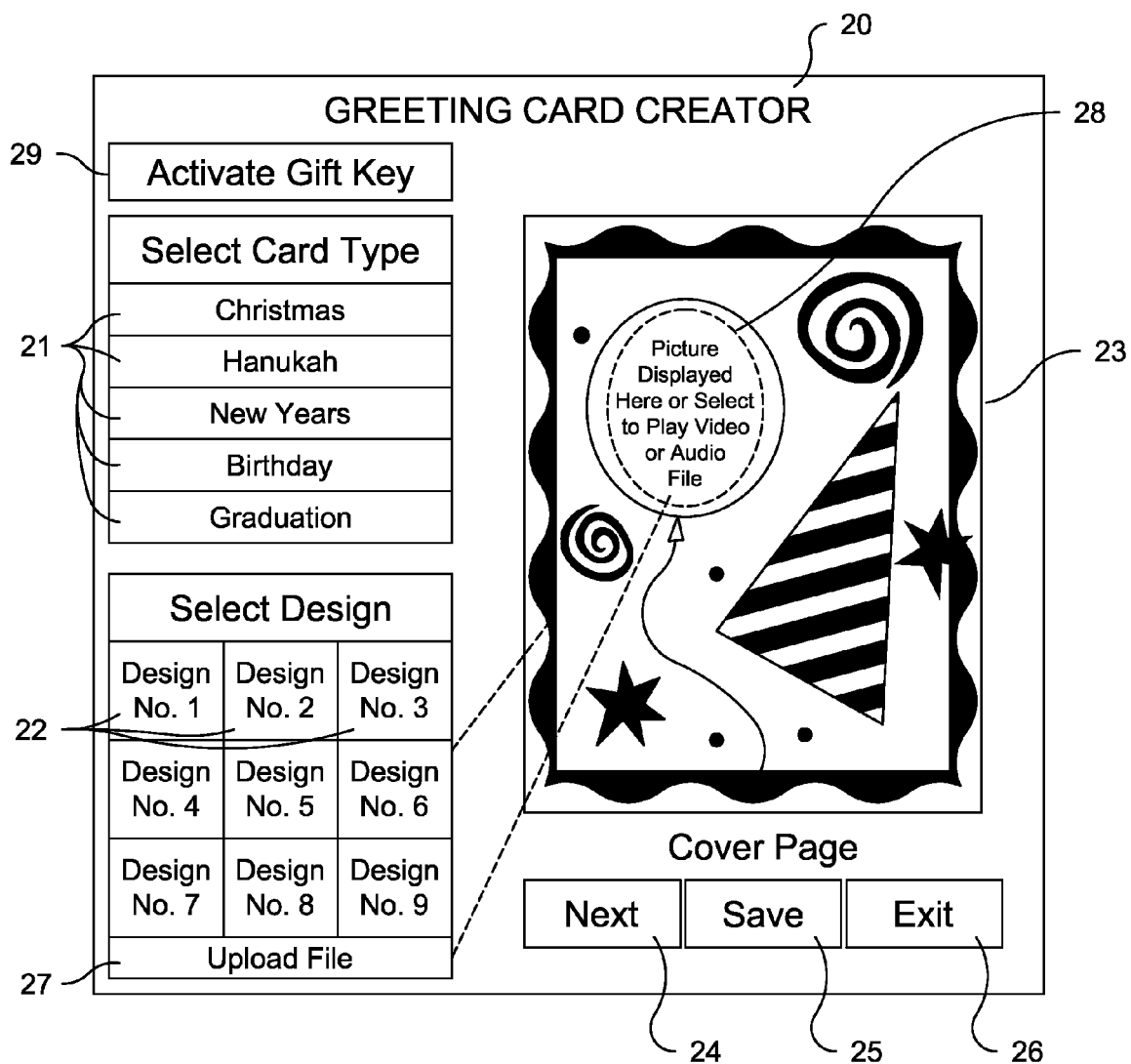
FIG. 6 is an exemplary webpage displayed by a host site used by a purchaser to customize a cover page of an electronic greeting card associated with a gift key in accordance with an embodiment of the invention.
Figure 7:
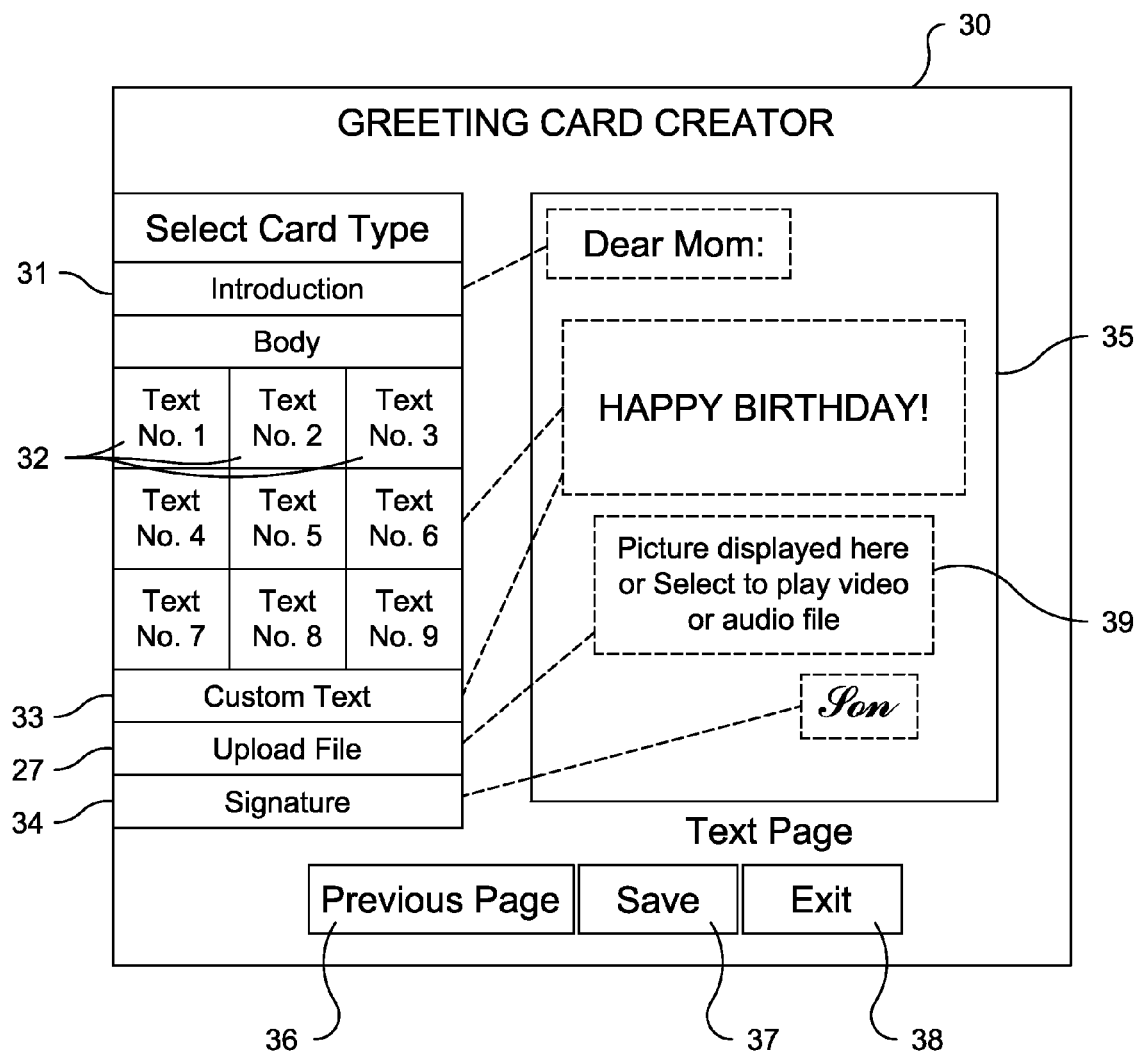
FIG. 7 is an exemplary webpage displayed by a host site used by a purchaser to customize a text page of an electronic greeting card associated with a gift key in accordance with one embodiment of the invention.

The CREATE CARD button 86 accesses the web pages shown in FIGS. 6 and 7, as described herein. The CREATE CARD button 86 could be disabled after it is first selected by a purchaser to prevent subsequent access by a recipient or reuse by a subsequent party. In some embodiments, the remaining buttons could be disabled to prevent access to these features by a purchaser, but otherwise selectable after subsequent connections.

Figure 8:
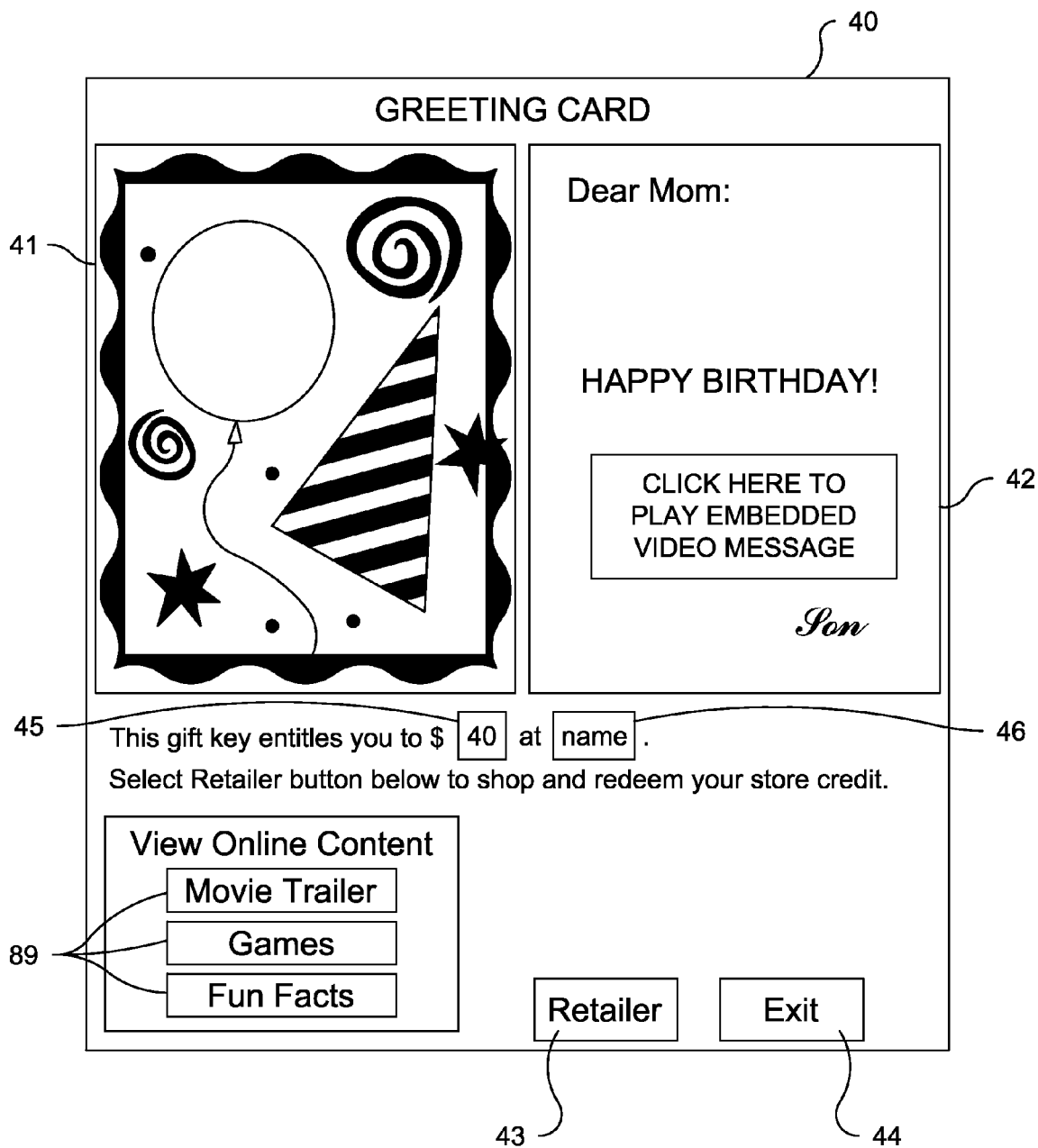
FIG. 8 is an exemplary greeting card with link to a retailer, for purpose of redeeming store credits, displayed by a host site to the recipient of a gift key in accordance with an embodiment of the invention.

The VIEW CARD button 87 accesses and displays the webpage shown in FIG. 8, as described herein. The VIEW CARD button 87 could be accessible by either a purchaser to preview a greeting card or a recipient to view a greeting card prepared by a purchaser.

One or more ONLINE SHOPPING buttons 88 access web pages at the host system 3 or provide a hyperlink to web pages viewable from a retailer system 4a-4f so as to facilitate online shopping by a recipient. The recipient then browses the web pages selecting items for purchase which are paid for with store credits associated with the gift key 5. When shopping is performed at the retailer level, the host system 3 could transmit the value of store credits available, account number and PIN, and other information transactional information to the retailer system 4a-4f to facilitate completion of a purchase transaction via processes employed by the retailer, after which the retailer communicates the total value of store credits used or remaining to the host system 3 so that the host system 3 is able to properly updates its database information for the gift key 5.

One or more ONLINE CONTENT buttons 89 access online content from the host system 3, retailer system 4a-4f, or other third party website, which correspond to the decorative design or theme of the gift key 5. In several examples, the ONLINE CONTENT button 89 could display a movie trailer in a popup screen, allow the recipient to access an online game, or allow the recipient to view information. Online content could be provided by the host system 3, a retailer system 4a-4f, or by a third party. The ONLINE CONTENT button 89 could include a "straight link" to a specific web address readable by a recipient or an "encrypted web link" whereby the web address is scripted so as to prevent a recipient from directly accessing the content without the gift key 5.

The recipient could customize an electronic greeting card linked to the gift key 5 via the serial or GUID number. This identifier is cross referenced at the host system 3 to identify the file or database location to display a greeting card whenever a purchaser creates or a recipient retrieves a card.

In some embodiments, the electronic greeting card is a Flash-based webpage. The greeting card is created and customized to include text, graphics, images, video, and/or audio. Text message boxes may include user drafted text fields positioned anywhere within the active area of a webpage and adjustable with respective to the style, color and size of fonts. Graphics and images in a variety of formats, examples including but not limited to JPEG and BMP, may be uploaded from a local system 1 to a host system 3, resized, and positioned anywhere within the active area of a webpage. Exemplary images could include clip art, backgrounds, and border. Video files in a variety of format, examples including but not limited to MPEG and AVI, may also be uploaded into the active area of a webpage and resized. Audio files in a variety of formats, one example being MP3, may also be updated into the active area of a webpage and queued to play when selected. Audio files may be created by the purchaser via known methods. In preferred embodiments, an electronic greeting card is created and customized by a purchaser using text, image, video, and/or audio templates.

Referring now to FIG. 6, a card creator webpage 20 is shown for the cover page displayed when the gift key 5 is first attached to a local system 1 or accessed via a landing webpage 84. A preview window 23 displays the cover page in real time as the purchaser selects designs and uploads files for display on the card. In this embodiment, the webpage 20 includes several CARD TYPES buttons 21 below the Select Card Type identifier which correspond to holidays, events, and celebrations for which a gift is appropriate. The purchaser selects the appropriate card type by placing a cursor over the button corresponding to the appropriate event and clicking a button on a mouse communicating with the local system 1. Selection of the card type causes the DESIGN buttons 22 below the Select Design identifier to be updated to display a design associated with each button in miniature. The purchaser selects a design by placing the cursor over a DESIGN button 22 and clicking a button on the mouse, after which the design is displayed within the preview window 23.

Some designs may include an upload frame 28 to display a picture or video or play an audio message for the recipient. A file is uploaded from the local system 1 to the host system 3 by placing the page cursor over the UPLOAD FILE button 27 and clicking a button on the mouse. A popup window is displayed to allow input of the name and location of the file on the local system 1 which corresponds to the image, video, or audio file. The file is transferred via protocols understood in the art from the local system 1 to the host system 3. Thereafter, the upload frame 28 is updated to show the picture or first image of the video or display a decorative image corresponding to an audio file. The cover page design is saved to a file located on the host system 3 by clicking the SAVE button 25. Alternatively, the purchaser may select the EXIT button 26 to exit to the host website without saving the card design.

An ACTIVATION button 29 could be included in some embodiments to allow the purchaser to activate the gift key 5. The ACTIVATION button 29 causes sub-steps (3) and (4) to be performed from the activation step 50, as described herein.

A NEXT button 24 is provided to allow the purchaser to display the webpage in FIG. 7. Referring now to FIG. 7, a webpage 30 is shown for the text page which is displayed when the gift key 5 is first attached to a local system 1. A preview window 35 displays the text page in real time as the purchaser selects an introduction, text, and signature and uploads files for display on the card. The purchaser inputs the introduction by selecting the INTRODUCTION button 31 and typing the desired text in the corresponding field within the preview window 35. In this embodiment, the webpage 30 includes TEXT buttons 32 below the Body identifier which correspond to pre-prepared messages consistent with the card type. The purchaser selects the appropriate text message by clicking a TEXT button 32, after which the selected text message is displayed within the preview window 35. A CUSTOM TEXT button 33 is also provided so as to allow the purchaser to compose a message for display in the corresponding field within the preview window 35. The purchaser inputs a signature by selecting the SIGNATURE button 34 and typing the desired text in the corresponding field within the preview window 35.

Some designs could include a display frame 39 to display a picture or video or play an audio message for the recipient. A file is uploaded from the local system 1 to the host system 3 by placing the page cursor over the UPLOAD FILE button 27 and clicking a button on a mouse. A popup window is displayed to allow input of the file name and its location on the local system 1 which corresponds to the file containing the image, video, or audio content. The file is transferred via protocols understood in the art from the local system 1 to the host system 3. Thereafter, the display frame 39 is updated to show the picture or first image of the video or display a decorative image corresponding to an audio file. The text page design is saved to a file or database located on the host system 3 by clicking the SAVE button 37. Alternatively, the purchaser may select the EXIT button 38 to exit to the host website without saving the card design. A PREVIOUS PAGE button 36 is provided to allow the purchaser to return to the webpage shown in FIG. 6.

Referring now to FIG. 8, a greeting card webpage 40 is shown which is when the gift key 5 is first attached to a local system 1 or accessed via a landing webpage 84 by a recipient. The greeting card webpage 40 includes a cover page frame 41 and text page frame 42 which display the pages customized by the purchaser, as previously described in FIGS. 6 and 7. The text page frame 42 is shown including an embedded video message which is accessed by placing the cursor within the field and selecting the field via a mouse button.

A gift value field 45 and retailer field 46 are provided for informational purposes. The gift value field 45 displays the present value of a store credit available at the retailer named in the retailer field 46. A RETAILER button 43 is provided to allow the recipient to launch the retail website associated with the gift key 5. An EXIT button 44 is provided to allow the recipient to exit the host website and return the web browser on the local system 1 to its default page.

In preferred embodiments, one or more ONLINE CONTENT buttons 89, as described herein, access online content from the host system 3, retailer system 4a-4f, or other third party website, which correspond to the decorative design or theme of the gift key 5.

The redemption of store credits could be processed via third party companies or the retailer directly via a secure connection between local system 1 with gift key 5 and host system 3 or retailer system 4a-4f. The methods and systems described herein are compatible with both externally and internally processed transactions.

Third party processing could include the steps of: (1) assigning an account number and PIN to each gift key 5 so as to avoid duplicate and conflicting identifiers; (2) bar coding each gift key 5; (3) storing store credit information in a database accessible by the thirty party via a reference system which allows for tracking and accounting for each gift key 5; and (4) interfacing with the retailer's management information system to retrieve transaction data and adjust the store credits available on a gift key 5. During a transaction, the gift key 5 communicates its GUID number to the host system 3 which is cross referenced by the host system 3. A portal is established to communicate with a third party to verify the account number and PIN for the gift key 5.

Internal or retailer processed transactions could include the steps of: (1) assigning an account number and PIN to each gift key 5 so as to avoid duplicate and conflicting identifiers; (2)

bar coding each gift key 5 by a certified factory; (3) storing store credit information in a database, managed by the retailer, via a reference system which allows for tracking and accounting for each gift key 5; and (4) interfacing with the retailer's database to retrieve transaction data and adjust the store credits available on a gift card 5. During a transaction, the gift key 5 communicates its GUID number to the host system 3 which is cross referenced by the host system 3. A portal is established to communicate with a retailer to verify the account number and PIN for the gift key 5.

Figure 9:
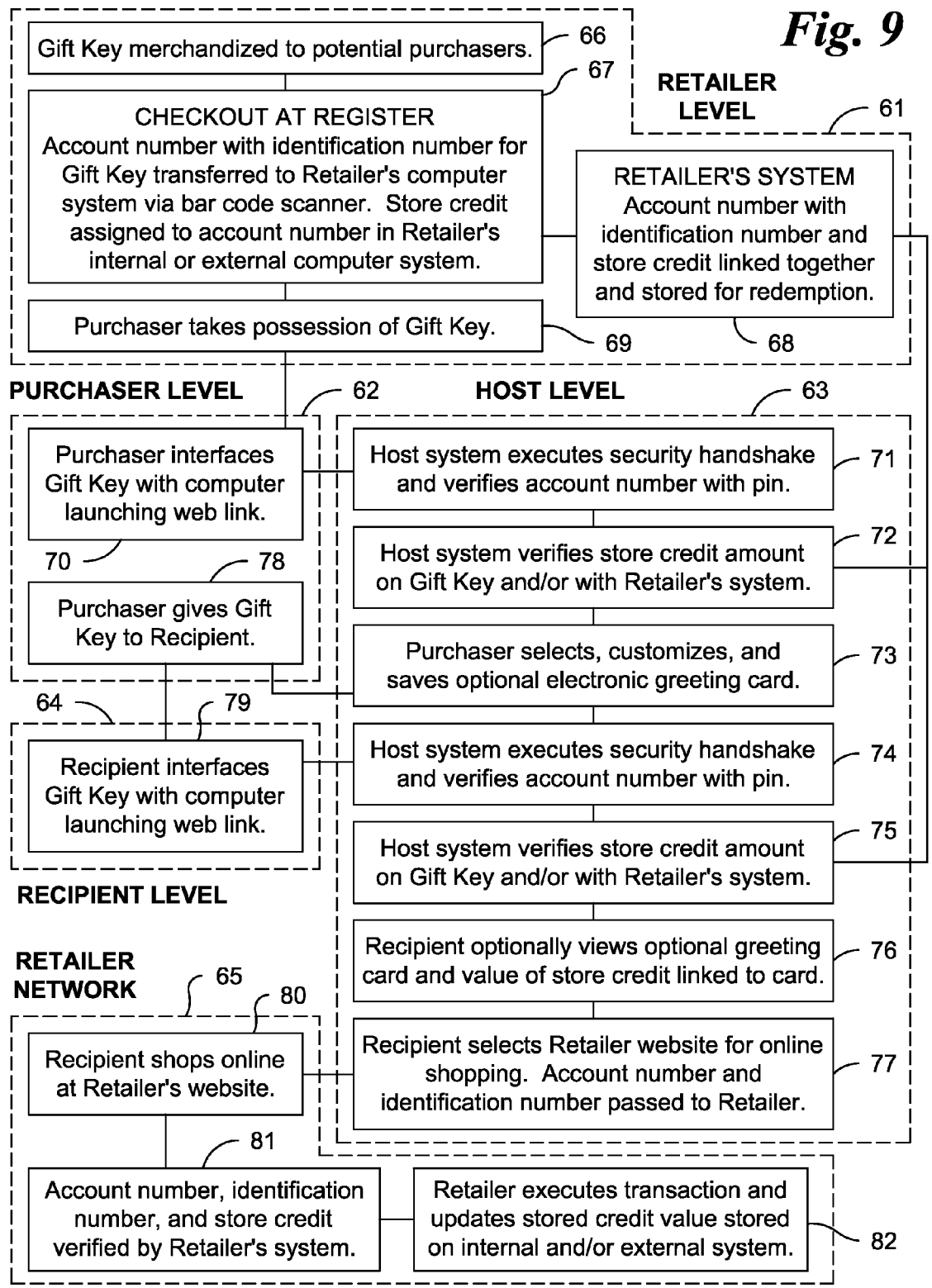
FIG. 9 is a flowchart illustrating interactions between retailer, purchaser, recipient, host and network levels in accordance with a preferred embodiment of the invention.

Referring now to FIG. 9, a flowchart is provided for one possible embodiment of system and method for a gift key 5 implemented transaction. The flowchart is not meant to be exhaustive, but rather is merely illustrative to assist in describing aspects of transaction in the manner described herein.

Steps 66-69 are performed at the retailer level 61 and include both traditional in-store and electronically-based, on-line events. In step 66, the gift key is merchandised to prospective purchasers at retail locations for purchase. In step 67, the purchaser has selected the gift key 5 for purchase at a retail location, online, or telephonically and pays for the device. When the purchase is made remotely, the activation step is performed before shipment of the purchaser. The gift key 5 is scanned to record one or more bar codes which appear on the device or packaging therefore. The store credit assigned to the gift key 5 is assigned to an account number for tracking purposes either external or internal to the retailer. In step 68, account number and store credit are cross referenced for later retrieval. In step 69, the purchaser takes possession and ownership of the gift key 5.

Steps 70 and 78 are performed at the purchaser level 62 and include physical events by the purchaser and intermediate or electronically implemented events, namely, steps 71-73, at the host level 63. In step 70, the purchaser either physically or wirelessly connects the gift key 5 to a computer. The gift key 5 automatically launches a webpage originating at the host level 63 and viewable at the purchaser level 62. In step 71, the host computer executes a security program to verify identifiers passed from the gift key 5 to the host. If identifiers fail verification, access is denied. Otherwise, in step 72 the host computer will verify the store credit value available with the gift key 5 at the host level 63 and/or the retailer level 61 and could display FIG. 5. In step 73, the purchaser customizes and saves an electronic greeting card at the host level 63 and viewable at the purchaser level 62 via the web pages described in FIGS. 6 and 7. In step 78, the purchaser physically transfers possession and ownership of the gift key 5 to a recipient.

Step 79 is performed at the recipient level 64 including a physical event by the recipient and electronically implemented events, namely, steps 74-77, at the host level 63. In step 79, the recipient either physically or wirelessly connects the gift key 5 to a computer. The gift key 5 automatically launches a webpage originating at a host level 63 and viewable at the recipient level 64. In step 74, the host computer executes a security program to verify identifiers passed from the gift key 5 to the host. If identifiers fail verification, access is denied. Otherwise, in step 75 the host computer will verify the store credit value available with the gift key 5 at the host level 63 and/or the retailer level 61 and could display FIG. 5. In step 76, the recipient could view the electronic greeting card stored at the host level 63 and viewable at the recipient level 64 via the webpage described in FIG. 8. In step 77, the recipient selects a retail site for online shopping and identifier information is transferred to the retailer network 65.

Steps 80-82 are performed at the retailer network 65 and include electronically-based, on-line events. In step 80, the recipient shops online by viewing web pages at the retailer network 65 and viewable at the recipient level 64. In step 81, the retailer network 65 verifies account and credit information via a cross reference to a key specific database. If identifiers fail verification, then access is denied. Otherwise, the user is permitted to view retailer's web pages. In step 82, the recipient has chosen goods or services for purchase and executes an online process specific to the retailer during which store credits are depleted from the gift key 5 and the recipient takes ownership of the goods and/or services. Steps 79, 74-77, and 80-82 are repeatable, if store credits remain on the gift key 5 after each transaction by the recipient.

The description above indicates that a great degree of flexibility is offered in terms of the present invention. Although systems and methods have been described in considerable detail with reference to certain preferred versions thereof, other versions are possible. Therefore, the spirit and scope of the appended claims should not be limited to the description of the preferred versions contained herein.

What is claimed is:

1. A method for presenting a gift to a recipient comprising the steps of:
   (a) activating a gift key prior to receipt of said gift key by said recipient, said gift key comprising a housing, an integrated circuit within said housing, and a physical interface or a wireless interface communicating with said integrated circuit; and
   (b) customizing by a purchaser of an electronic greeting card associated with said gift key at a host site from a first local computer after said activating step, said first local computer communicates with said host site via a network, said gift key launches said host site for purpose of said customizing step when said gift key is linked to said first local computer, said gift key having a store credit associated therewith, said gift key physically possessed by said purchaser, said gift key physically transferred from said purchaser to said recipient.

2. The method of claim 1, wherein said activating step includes:
   (i) swiping, scanning, or linking said gift key at point-of-purchase so as to read an identification number from and unique to each said gift key;
   (ii) matching said identification number to a database to authenticate the value of said store credit, said store credit associated with said gift key; and
   (iii) authorizing subsequent use of said gift key by a purchaser of said gift key.

3. The method of claim 1, wherein said customizing step includes:
   (i) linking said gift key to said first local computer;
   (ii) launching a first browser on said first local computer to a web address retrievable from said gift key;
   (iii) executing a security algorithm to enable interface with said host site;
   (iv) communicating an identification number from said gift key;
   (v) matching said identification number to a database to verify the value of said store credit associated with said gift key; and
   (vi) preparing said electronic greeting card using said first local computer via webpages at said host site, said host site displays said store credit.

4. The method of claim 3, wherein said customizing step further includes:
   (vii) activating said gift key for use via said host site.

5. The method of claim 3, wherein said customizing step further includes:
(viii) transferring said gift key to said recipient.

6. The method of claim 1, further comprising the steps of:
(c) accessing by said recipient of said greeting card at said host site after linkage of said gift key to a second local computer, said second local computer communicating with said host site via said network; and
(d) redeeming by said recipient of said store credit at a retail website via said second local computer after linkage of said gift key to said second local computer.

7. The method of claim 6, wherein said first local computer and said second local computer are the same device.

8. The method of claim 6, wherein said accessing step includes:
(i) linking said gift key to said second local computer;
(ii) launching a second browser on said second local computer to a web address retrievable from said gift key;
(iii) executing a security program to enable interface with said host site;
(iv) communicating an identification number from said gift key;
(v) matching said identification number to a database to authenticate the value of said store credit associated with said gift key; and
(vi) viewing said greeting card and said store credit displayed on said second local computer by said host site.

9. The method of claim 8, wherein said accessing step further includes:
(vii) displaying at least one advertisement at said host site.

10. The method of claim 8, wherein said accessing step further includes:
(viii) displaying theme related content based on said gift key.

11. The method of claim 10, wherein said theme related content is a game, a movie trailer, factual information, or media.

12. The method of claim 6, wherein said redeeming step includes:
(i) launching a retailer website via said host site;
(ii) viewing goods and/or services at said retailer website;
(iii) purchasing goods and/or services at said retailer website; and
(iv) updating said store credit after said purchasing step.

13. The method of claim 12, further comprising the step of:
(v) passing an identification number unique to said gift key via said second local computer to said retailer website for online transaction.

14. The method claim 13, wherein said redeeming step further includes:
(vi) exiting said retailer website; and
(vii) exiting said host site.

15. A system for presenting a gift to a recipient comprising:
(a) a gift key including a housing, an integrated circuit within said housing, and a physical interface or a wireless interface electrically attached to said integrated circuit so as to allow use of said gift key over a network, said gift key having an identification number and at least one web address readable from and a security algorithm executable by said integrated circuit, said gift key linkable to a local computer via said physical interface or said wireless interface; and
(b) a host computer controlling a host site, said gift key launching said host site accessible from said local computer when said gift key is linked to said local computer, said host site enabling design of a greeting card associated with said gift key, display of said greeting card, and redemption of a store credit associated with said gift key via at least one retailer computer controlling at least one retailer website, said gift key communicating via said local computer with said host computer and said at least one retailer computer via said network.

16. The system of claim 15, wherein said physical interface contacts a port attached to said local computer.

17. The system of claim 15, wherein said wireless interface communicates with said local computer via wireless means.

18. The system of claim 17, wherein said wireless interface is enabled via Bluetooth, Wifi, or IrDa.

19. The system of claim 15, wherein said connector is a USB plug and said integrated circuit includes a read-only memory, a flash memory, and a USB controller.

20. The system of claim 15, wherein said housing includes a three-dimensional decorative design.

21. The system of claim 15, further comprising:
(c) at least one appendage attached to said housing.

22. The system of claim 15, wherein said physical interface or said wireless interface is extendable from and retractable into said housing.

23. The system of claim 15, wherein said recipient accesses said retailer website via said host site.

24. The system of claim 15, wherein said network is an internet.

25. The system of claim 15, further comprising:
(c) at least one bar code disposed along said gift key, said at least one bar code corresponding to said identification number.

26. A method for presenting a gift to a recipient comprising the steps of:
(a) activating a gift key prior to use by said recipient, said gift key comprising a housing, an integrated circuit within said housing, and a physical interface or a wireless interface communicable with said integrated circuit, said gift key automatically launching a host website at a host computer when said gift key is linked to a first local computer; and
(b) redeeming by said recipient of a store credit associated with said gift key at a retail website via said first local computer or a second local computer after linkage of said gift key to said first local computer or said second local computer, said gift key automatically launching said host website or a second website at a retailer computer when said gift key is linked to said first local computer or said second local computer.

27. The method of claim 26, further comprising the step of:
(c) creating an electronic greeting card at said host website via said first local computer after said gift key is linked to said first local computer, said greeting card stored by said host computer and associated with said gift key.

28. The method of claim 27, further comprising the step of:
(d) viewing said electronic greeting card by said recipient at said host website via said first local computer or said second computer after said gift key is linked to said first local computer or said second local computer.

* * * * *

UNITED STATES PATENT AND TRADEMARK OFFICE
CERTIFICATE OF CORRECTION

| | | |
|---|---|---|
| PATENT NO. | : 8,086,494 B2 | Page 1 of 1 |
| APPLICATION NO. | : 12/192445 | |
| DATED | : December 27, 2011 | |
| INVENTOR(S) | : Christopher P. Dooley et al. | |

It is certified that error appears in the above-identified patent and that said Letters Patent is hereby corrected as shown below:

Column 7, Line 20 - delete "replica" and insert --replicate--

Column 15, Line 15 - insert --a-- before "transaction"

Column 16, Line 7 of Claim 2 - delete "the" and insert --a--

Column 16, Line 11 of Claim 3 - delete "the" and insert --a--

Column 17, Line 2 of Claim 7 - delete "the" and insert --a--

Column 17, Line 11 of Claim 8 - delete "the" and insert --a--

Signed and Sealed this
Twenty-eighth Day of August, 2012

David J. Kappos
*Director of the United States Patent and Trademark Office*